Figure 1:
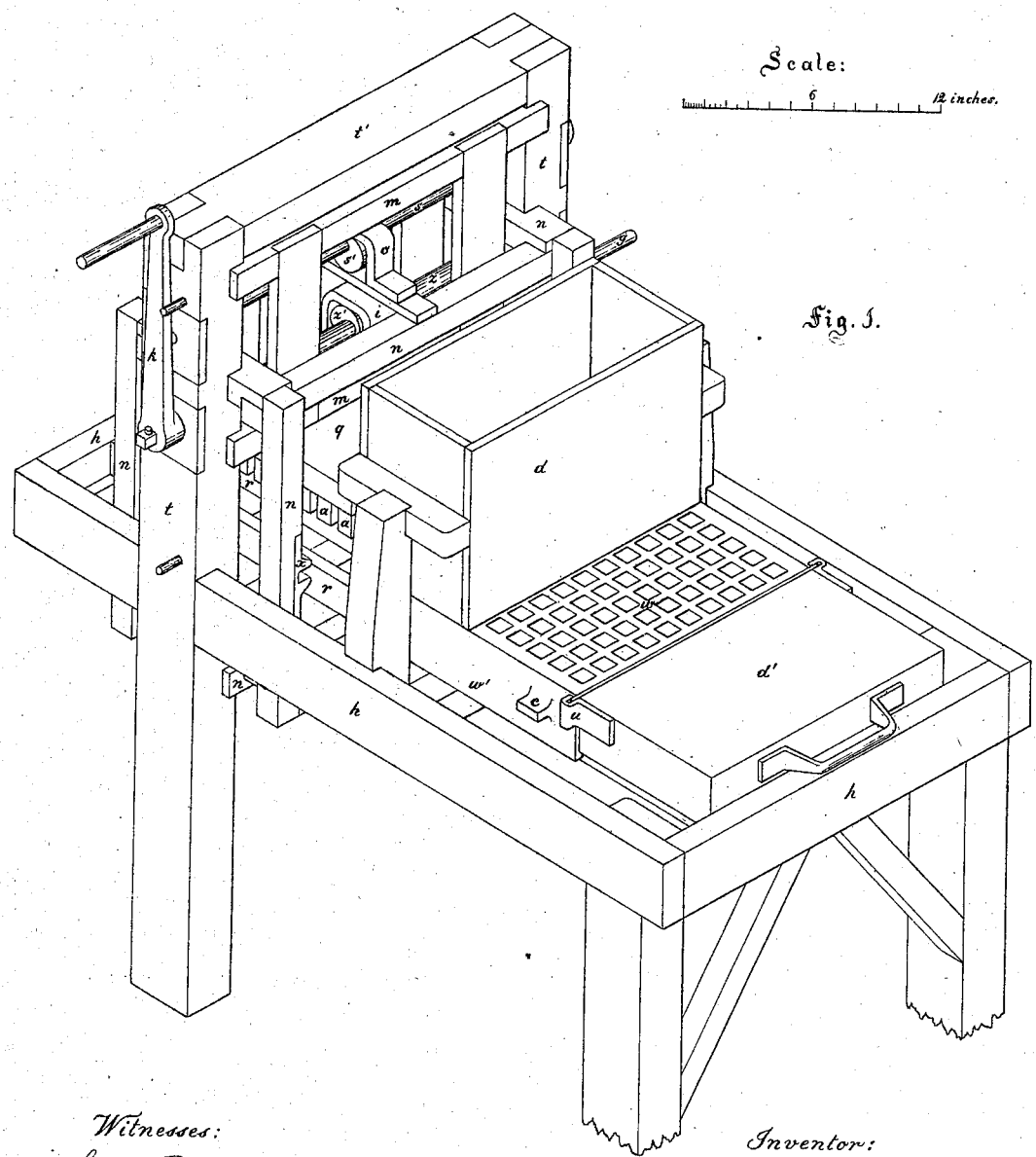

A. F. W. PARTZ.

Improvement in Apparatus for the Manufacture of Cube-Sugar.

No. 131,898. Patented Oct. 1, 1872.

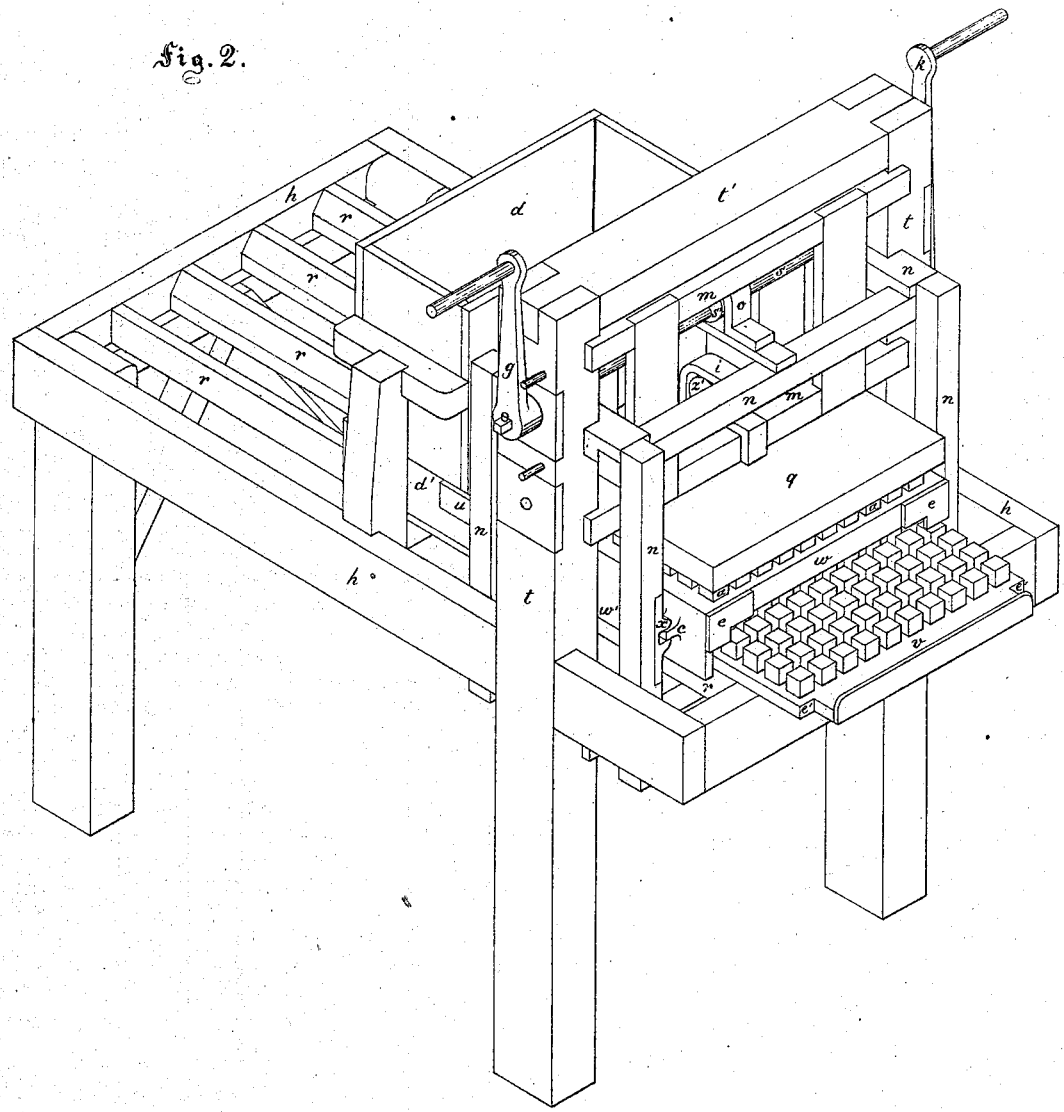

UNITED STATES PATENT OFFICE.

AUGUST F. W. PARTZ, OF OAKLAND, CALIFORNIA.

IMPROVEMENT IN APPARATUS FOR THE MANUFACTURE OF CUBE SUGAR.

Specification forming part of Letters Patent No. 131,898, dated October 1, 1872.

*To all whom it may concern:*

Be it known that I, AUGUST F. W. PARTZ, of Oakland, in the county of Alameda and State of California, have invented certain Improvements in the Manufacture of Cube Sugar, of which the following is a specification:

My invention relates to that class of machines for transforming loose granular sugar into solid "cubes" or "blocks," a distinguishing feature of which is a mold in the shape of a frame containing a series of compartments, in which the sugar is compacted, and from which it is thereupon discharged by pistons; and its nature consists in two mechanical devices, one of which is for the purpose of easily and expeditiously charging the mold with granular sugar, and the other for that of discharging the compacted sugar from the mold without detriment to the shape which it has obtained. The first of these purposes I accomplish by employing a stationary filling-box, the bottom of which can be drawn from under it and be replaced by the mold, which rests on a board or plate, and is connected on the same plane with the bottom of the box, both being arranged to slide together upon tracks, so that by withdrawing and replacing the bottom the mold is passed to and fro underneath the box, from which it is filled with loose sugar falling into it. The second purpose I accomplish by causing the mold, after the sugar has been compressed therein, to be lifted, so as to slip over the pistons, which, meanwhile, retain their position upon the cubes of sugar, and after the raising of which the underlying board or plate with the sugar deposited thereon may be removed.

The following is a full and exact description of my invention, reference being had to the accompanying drawing, which forms part of this specification, and wherein—

Figure 1 is an isometrical view of a machine embodying my invention, which represents the movable parts in the positions in which they are while the mold is being charged with granular sugar; and Fig. 2 is a like view of the same machine from the opposite side, representing the movable parts in the positions in which they are while the board upon which the pressed cubes of sugar have been deposited is being withdrawn.

$h$ is a horizontal frame supported on legs and holding the rails or bars $r\ r$, for which, as a track, a platform may be substituted. Joined to this frame are two upright posts, $t\ t$, that are connected at their upper ends by a cross-beam, $t'$. $s$ and $z$ are two shafts, upon which are fastened two eccentrics, $s'$ and $z'$, and at opposite ends also two cranks, $g$ and $k$. The eccentrics turn in yokes $o$ and $i$, attached to frames $n$ and $m$, which are guided in their up-and-down motions by the posts $t$. $w$ is a mold containing a series of square compartments, open at top and bottom; they are made of a width equal to the intended size of the cubes of sugar, and deeper than they are wide. Two opposite sides of this mold are provided with downwardly-projecting flanges $w'\ w'$, for guiding it when sliding upon the rails $r$. $d$ is a box supported by standards from the frame $h$. The piece $d'$, which forms its bottom, can be drawn from under it and replaced, sliding upon the rails $r$, it being provided, like the mold, with two guiding-flanges and also with a handle. The mold $w$ and the bottom piece $d'$ are connected by means of two clasps, $u\ u$, attached to the latter, and two flat projections extending from the corners of the mold and fitting into the clasps, in which they can move up and down, so that the mold may be raised so far as necessary without becoming disconnected. Under the mold is placed a board, $v$, which is held and drawn along with the mold upon the rails by the latch-strips $e\ e$ bearing against the shoulders $e'\ e'$, but is released when the mold is raised, and may then be removed and replaced. Upon each of the two sides of the mold, which have the flanges $w'$, are two projections, $c\ c$, designed to slip into grooves $x\ x$ upon the four vertical rods of the frame $n$, so that by turning the crank $g$ up or down the mold can be raised or lowered, it being locked for the time to the frame $n$. $q$ is a plate, upon the lower face of which is secured a series of square pistons, $a\ a$, corresponding to and fitting into the perforations of the mold $w$. The plate is fastened to the frame $m$, so that it is raised or lowered by a half turn of the crank $k$.

The operation is as follows: The box $d$ being filled with moist granular sugar, the crank $k$ being turned up and the crank $g$ down, and the board $v$ being placed under the mold $w$, a workman standing at that end of the machine which, in Fig. 1 is to the right and in Fig. 2 to the left, and whom I will designate as A, takes hold of the handle attached to the bottom piece $d'$, draws the latter from under the box $d$ to the end of the rails $r$, and pushes it back into its former place. By this movement the mold $w$, being linked to the bottom piece $d'$, is made to slide forth and back under the box $d$, and is thereby charged with granular sugar falling into it. The mold having returned to its position under the pistons $a$, another workman, B, standing opposite to A, forces down the crank $k$, whereby the pistons are made to compress the sugar in the mold to about two-thirds of its former bulk, thus shaping it into cubes of nearly equal sides. A then turns up the crank $g$, thereby lifting the mold, so that it slips entirely over the pistons, which, meanwhile, retain their position upon the sugar. B thereupon raises the crank $k$, and the cubes of sugar being thus released, he draws out the board $v$, on which they are deposited, puts it upon a drying-frame, and shoves another similar board under the mold. A now turns down the crank $g$, and the operation proceeds again in the same manner as described.

Of boards like $v$ there must be a sufficient number to last for about two hours' work, as within that time, in a properly heated and ventilated room, the sugar becomes dry and hard enough to be boxed or barreled, so that the boards can then be used over again.

It will be observed that by the means which I employ the sugar, in being transformed into cubes, is effectually prevented from crumbling, and therefore the cubes obtained are sharply defined and uniform in shape; while the manner in which I charge the mold with granular sugar greatly facilitates the operation. Even if the stationary filling-box with its movable bottom should be dispensed with the arrangement whereby the mold can be slid from underneath the pistons would still afford considerable advantage in the charging of it by other means.

Instead of the projections $c$ being on the mold $w$, and the grooves $x$ on the frame $n$, the former may, to the same purpose, be on the frame and the latter on the mold. Instead of sliding the bottom piece $d'$ and the mold $w$, and of turning the shafts $s$ and $z$ by hand, the alternate movements may be performed by the application of steam or other power, and the intermissions be controlled by a suitable friction-gear.

To make sugar that may have a tendency to clog drop more freely into the mold when it passes under the filling-box, a horizontal shaft with stirring-arms may be placed lengthwise in the box, outside of which a cog-wheel is fastened upon the shaft, while the corresponding upper edge of the mold, or also of the bottom piece $d'$, is provided with a rack, so that when the mold is moved under the box the shaft is turned and the sugar loosened.

The compartments of the mold $w$ need not be square, as herein represented, but may be made of different shapes, my improvements applying equally to the production of lumps of sugar of various forms.

I claim as my invention—

1. The movable mold $w$, with the underlying board or plate $v$, in combination with the rails or tracks $r$, upon which they can be slid from underneath the pistons $a$ for the purpose of charging the mold with granular sugar, substantially as herein set forth.

2. The stationary box $d$ with its movable bottom $d'$, in combination with the mold $w$, both the bottom and mold being connected by a sliding joint or an equivalent device, so that the mold may be raised to nearly its own height without becoming disconnected, and may be moved simultaneously with the bottom $d'$ on a horizontal plane, substantially as and for the purpose herein described.

3. The mold $w$, provided with the projections $c$, in combination with the frame $n$, provided with the grooves $x$ with which the projections $c$ interlock, so that by raising or lowering the frame $n$ the mold $w$ is also raised or lowered, substantially as and for the purpose herein specified.

4. The mechanism consisting of the shaft $z$, the eccentric $z'$, the yoke $i$, and the frame $m$ or its equivalent, attached to the plate $q$, in combination with the mechanism consisting of the shaft $s$, the eccentric $s'$, the yoke $o$, and the frame $n$ or its equivalent, constructed and operated substantially as and for the purpose herein set forth.

AUGUST F. W. PARTZ.

Witnesses:
J. L. BOONE,
C. M. RICHARDSON.